(12) United States Patent
Zhang et al.

(10) Patent No.: US 9,860,654 B2
(45) Date of Patent: Jan. 2, 2018

(54) METHOD FOR SYNCHRONIZING THE REPRODUCTION OF A DIGITAL SIGNAL SENT BY A TRANSMITTER TO A PLURALITY OF MOBILE AUDIO TERMINALS

(71) Applicant: SIVANTOS PTE. LTD., Singapore (SG)

(72) Inventors: Jie Zhang, Beijing (CN); Mattias Lampe, Wolfenbuettel (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 15/137,392

(22) Filed: Apr. 25, 2016

(65) Prior Publication Data

US 2016/0316302 A1 Oct. 27, 2016

(30) Foreign Application Priority Data

Apr. 24, 2015 (DE) .......................... 10 2015 207 608

(51) Int. Cl.
*H04R 25/00* (2006.01)
*H04R 27/00* (2006.01)
(Continued)

(52) U.S. Cl.
CPC .......... *H04R 25/505* (2013.01); *H04J 3/0632* (2013.01); *H04R 25/55* (2013.01);
(Continued)

(58) Field of Classification Search
CPC .... H04R 25/55; H04R 25/505; H04R 25/552; H04R 25/554; H04R 25/558;
(Continued)

(56) References Cited

U.S. PATENT DOCUMENTS 6,819,732 B1 11/2004 Savell
7,778,432 B2 * 8/2010 Larsen ................. H04R 25/554
381/314

(Continued)

FOREIGN PATENT DOCUMENTS

EP 1715723 A2 10/2006
EP 2355387 A1 8/2011
EP 1657958 B1 6/2012

*Primary Examiner* — Huyen D Le
(74) *Attorney, Agent, or Firm* — Laurence A. Greenberg; Werner H. Stemer; Ralph E. Locher

(57) ABSTRACT

A method for synchronizing the reproduction of a digital signal sent by a transmitter to a plurality of mobile audio terminals. The transmitter sends the digital signal as a multiplicity of data packets at a data rate that is constant as an average over time. A signal receiver of each mobile audio terminal receives at least a subset of the multiplicity of data packets and generates a time reference signal. A FIFO signal with information on an occupancy level of a FIFO memory of the mobile audio terminal at specific time points is generated, an instantaneous reproduction speed is set on the basis of the time reference signal and the FIFO signal, the audio reproduction unit reproduces at the instantaneous reproduction speed samples corresponding to the digital signal. The occupancy level of the FIFO memory is thereby kept constant as an average over time.

10 Claims, 2 Drawing Sheets

(51) Int. Cl.
  *H04J 3/06* (2006.01)
  *H04W 28/02* (2009.01)
  *G06F 5/12* (2006.01)
  *H04L 7/00* (2006.01)
  *H04L 25/02* (2006.01)

(52) U.S. Cl.
  CPC ......... *H04R 25/552* (2013.01); *H04R 25/554* (2013.01); *H04R 25/558* (2013.01); *H04R 27/00* (2013.01); *H04W 28/0278* (2013.01); *G06F 5/12* (2013.01); *H04L 7/0029* (2013.01); *H04L 25/0262* (2013.01); *H04R 2225/43* (2013.01); *H04R 2225/55* (2013.01); *H04R 2420/07* (2013.01)

(58) Field of Classification Search
  CPC .......... H04R 2225/55; H04R 2227/003; H04R 2420/07; H04R 2225/43; H04R 2227/005; H04J 3/0632
  USPC ...... 381/23.1, 312, 314, 315, 320, 321, 323; 375/354, 355; 370/352
  See application file for complete search history.

(56) References Cited

U.S. PATENT DOCUMENTS

| | | | |
|---|---|---|---|
| 8,620,013 B2 | 12/2013 | Roeck | |
| 2010/0158292 A1* | 6/2010 | Pedersen | ................ H04R 25/55 381/315 |
| 2013/0170654 A1 | 7/2013 | Ell et al. | |

* cited by examiner

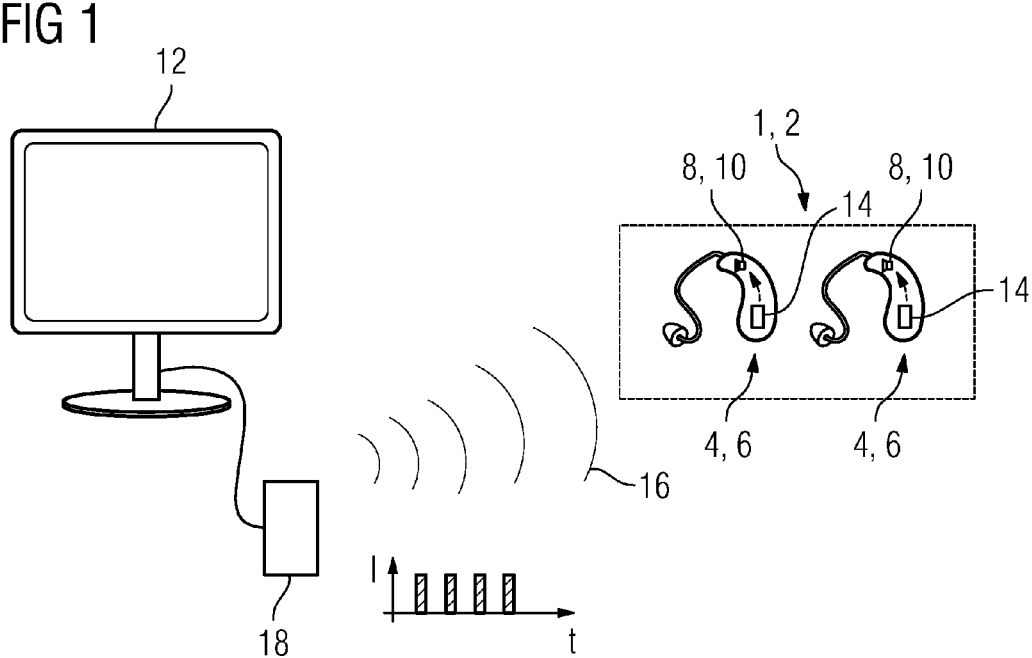
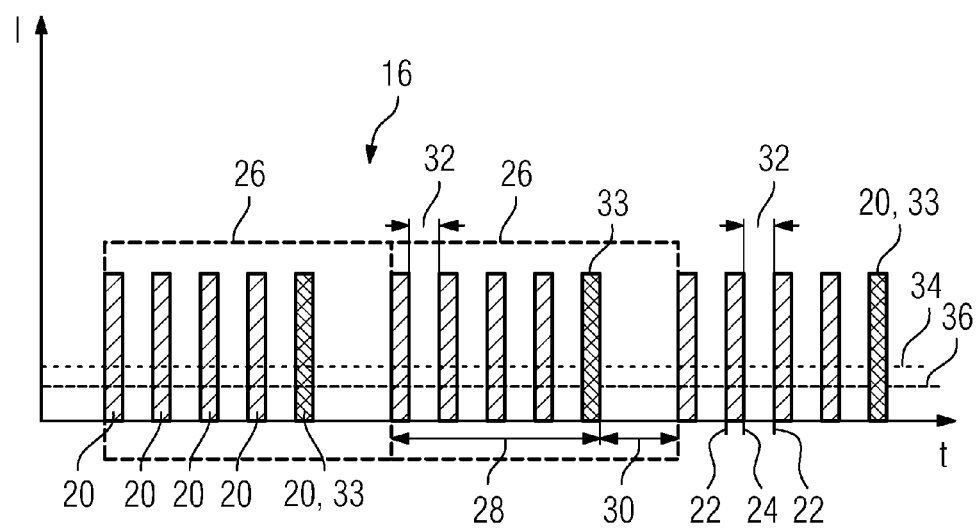

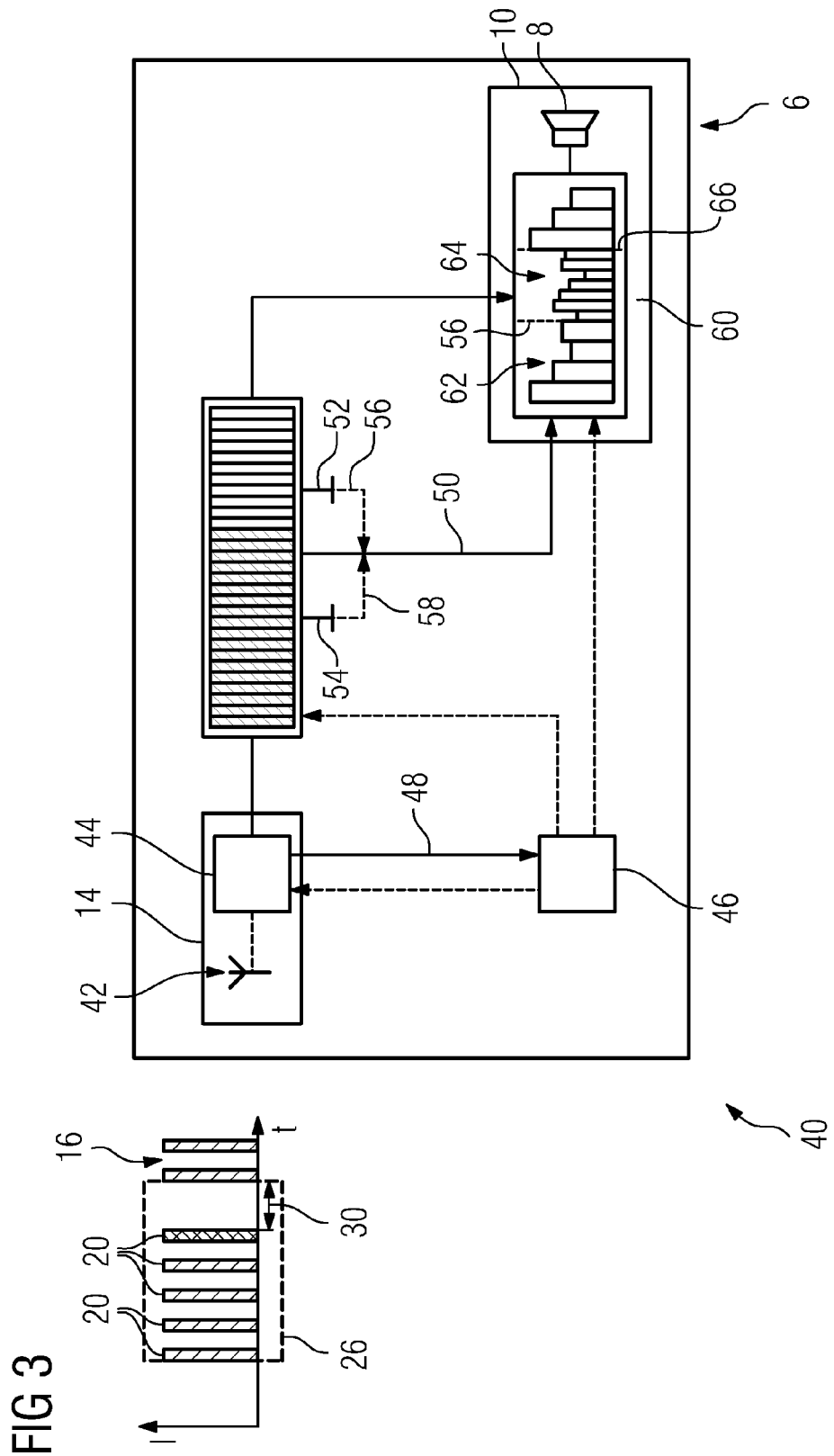

METHOD FOR SYNCHRONIZING THE REPRODUCTION OF A DIGITAL SIGNAL SENT BY A TRANSMITTER TO A PLURALITY OF MOBILE AUDIO TERMINALS

BACKGROUND OF THE INVENTION

Field of the Invention:

The invention relates to a method for synchronizing the reproduction of a digital signal sent by a transmitter to a plurality of mobile audio terminals, wherein the mobile audio terminals each comprise a signal receiver, a First-In-First-Out memory connected to the signal receiver and an audio reproduction unit connected to the First-In-First-Out memory.

Until now, digital wireless connections have been used for hearing aids primarily to allow adjustment of the operating parameters of the hearing aid, for instance the volume, from a hand-held device. Recently, digital wireless transmission protocols have also been used to stream audio data to the hearing aid from a source designed for this purpose, for instance from a television set or a telephone. In this case, the source has a wired signal connection to a transmitter, which emits a digital radio signal that can be received by a hearing aid equipped with a suitable signal receiver.

To give a particular surround sound effect, it is advantageous here to use a separate hearing aid for each ear and to encode the signal sent by the transmitter in a suitable form for stereo reception. In this case, the hearing aids have two operating modes: in standard mode, a microphone or microphone system of each hearing aid picks up acoustic signals from the surroundings, which are amplified in the hearing aid and which a loudspeaker reproduces to the user's ear; in streaming mode, a digital radio signal containing encoded audio data is received, and the loudspeaker reproduces the audio data. A hand-held device for controlling the volume or for switching between the operating modes etc. can optionally also be provided here.

Reproduction of the transmitted audio data must proceed preferably synchronously for the left and right ears. If the reproduction is not entirely synchronous, i.e. if there is a slight time offset between the signals for the left ear and the right ear, this is perceived by the user as a shift in the direction from which the sound is coming. A sound signal that is perceived as centered when reproduction is synchronous, for the user of the hearing-aid system has its origin to the right or left of center when synchronization is incorrect. The described spatial asymmetry in perception can arise even for a time offset of the order of about ten audio samples.

Such a time offset does not normally occur in conventional audio reproduction units, because either, for instance as with active stereo headphones, a common receiver is used for receiving, and common time synchronization is used for distribution to the separate stereo reproduction units, or the separate stereo reproduction units are in radio communication with one another for synchronizing their respective time scales, as is the case in home cinema systems for example. In a binaural hearing-aid apparatus, however, there is normally no wired connection between the two hearing aids, and also, for reasons of battery capacity, it is usually undesirable to have wireless synchronization of the time scales of said hearing aids. The timing of the reproduction of received digital audio data is thus performed solely on the basis of the internal clock in each hearing aid.

In a binaural hearing-aid system, however, the two internal clocks of the respective hearing aids can exhibit very slight differences. For instance if quartz crystals are used for timing, such differences can arise from component variation or very slight differences in dimensions resulting from manufacturing tolerances. In this case, the differences in timing are typically in the range of 0.001% to 0.01%. Since the audio data is normally not transmitted in real time but is combined by the transmitter into data packets at significantly higher data rates than the reproduction data rate, the data received in each separate hearing aid is buffered in a memory, and therefore the reproduction synchronization depends solely on the respective internal clocks of the hearing aids. For a case in which the timing differs by 0.001% and the sample rate of the audio signal is 16 kHz, then after a reproduction of one minute, an offset of 9.6 samples can accumulate, which corresponds to a time offset of 0.6 ms between the two ears, and which a hearer can already perceive.

BRIEF SUMMARY OF THE INVENTION

Hence the object of the invention is to define a method for synchronizing the reproduction of a digital signal sent by a transmitter to a plurality of mobile audio terminals, which method should not require any signal connection whatsoever between the respective audio terminals.

This object is achieved according to the invention by a method for synchronizing the reproduction of a digital signal sent by a transmitter to a plurality of mobile audio terminals, wherein the mobile audio terminals each comprise a signal receiver, a First-In-First-Out memory connected to the signal receiver and an audio reproduction unit connected to the First-In-First-Out memory, and wherein the transmitter sends the digital signal as a multiplicity of data packets at a data rate that is constant as an average over time. It is intended here that for each mobile audio terminal, in the same manner in each case, the signal receiver receives at least a subset of the multiplicity of data packets, the signal receiver generates from the received data packets a time reference signal, a FIFO signal, which contains information on the occupancy level of the First-In-First-Out memory at specific time points, is generated from the First-In-First-Out memory, an instantaneous reproduction speed is set on the basis of the time reference signal and the FIFO signal, the audio reproduction unit reproduces at the instantaneous reproduction speed samples corresponding to the digital signal, and the occupancy level of the First-In-First-Out memory is thereby kept constant as an average over time. The subject matter of the dependent claims and of the description below contains advantageous embodiments, some of which are inventive in their own right.

The invention provides that the digital signal is in particular a radio signal containing digitally encoded data, for example in the form of a carrier frequency phase-modulated by the digital data. The data packets each form self-contained entities in time. The data rate of the transmitter is in particular constant as a time-average obtained over a multiplicity of data packets. The occupancy level of the First-In-First-Out memory is accordingly constant as a time-average obtained over a multiplicity of data packets or over a plurality of time-reference-signal pulses.

The invention here first exploits the finding that, owing to the data packets being self-contained entities in time, a time pattern of intervals, in which information is either sent or not sent, is defined by the transmitter during sending regardless of the information encoded for each data packet. This time pattern is identical for each mobile audio terminal, and therefore can be used for synchronization amongst the audio terminals. For this purpose, the time pattern formed by the received data packets is used in the same way in each mobile audio terminal to generate the time reference signal. In particular this does not require a change in the transmission protocol used by the transmitter to send the data packets. Thus synchronization is performed solely at the level of the mobile audio terminals. To form the time reference signal, it is possible here, if applicable, to exploit the fact that often the transmitter combines respective groups of data packets into time frames, in each of which the time sequence of intervals during which data packets are sent is identical. Hence owing to the time-symmetry amongst the frames, a time pattern is defined by the transmitter, which can be easily detected and used by the mobile audio terminals.

The data rate, i.e. the amount of data per unit of time, during sending of individual data packets is normally higher than the reproduction rate, i.e. the amount of data per unit of time in the reproduction signal, which reproduction rate is given by the reproduction speed. This means that individual received data packets must be buffered temporarily in each mobile audio terminal, and the audio reproduction unit concerned takes the audio data intended for reproduction from a memory provided for said buffering. The reproduction speed here depends on the particular internal clock in each mobile audio terminal. Thus although now a time reference signal is generated from the received data packets that allows uniform synchronization for all mobile audio terminals, it is still required to use the time reference signals to synchronize the reproduction in such a way that the different timings from the respective internal clocks of the mobile audio terminals do not have any repercussions whatsoever.

To that end, the invention recognizes that for every pair of mobile audio terminals whose internal clocks exhibit very slightly different timing, owing to the resultant different reproduction speed with respect to an actual reference timing, the volume of buffered audio data intended for reproduction is likewise different for both mobile audio terminals. A fixed reproduction speed, i.e. a fixed data rate during reproduction, in a mobile audio terminal depends on the internal timing. When using a First-In-First-Out memory (FIFO memory), a change in the volume of buffered data intended for reproduction can now be regarded as an indicator that the internal timing in the mobile audio terminal differs slightly from the timing of the transmitter. Since all the mobile audio terminals receive the same audio data, encoded in the data packets, an occupancy level of the FIFO memory that is constant as an average over time means that the corresponding actual reproduction speed of a mobile audio terminal is synchronized with the data rate of the transmitter, which is constant as an average over time, regardless of the internal clock of said mobile audio terminal.

Hence for all the mobile audio terminals, the particular occupancy level of the FIFO memory must accordingly be kept constant as an average over time in order to synchronize said mobile audio terminals with one another. To this end, for each mobile audio terminal, information on the occupancy level of the FIFO memory is obtained in the same manner in each case at time points defined by the particular time reference signal, with the result that it is possible to determine changes in the occupancy level of the FIFO memory between said time points.

If such a change in the occupancy level of the FIFO memory is then ascertained in a mobile audio terminal because the FIFO signal contains information to this effect, then the reproduction speed for the audio reproduction unit can be adjusted accordingly and hence the FIFO memory returns to the desired value.

For example, the time reference signal, which is generated by a mobile audio terminal from the data packets sent by the transmitter, defines a time point at which the occupancy level of the FIFO memory is determined and is output as the FIFO signal. If this occupancy level lies above an upper target value, for instance, this means that the signal receiver is receiving a larger volume of audio data, encoded in the data packets, than the audio reproduction unit is converting into samples and reproducing. The instantaneous reproduction speed of the audio reproduction unit is accordingly increased briefly on the basis of the internal clock of the mobile audio terminal, so that more samples per unit of time are reproduced for a short period. Alternatively, the increase can also be performed without specifying a particular time, and in this case can last until the level drops below the upper target value again and until a corresponding indication in the FIFO signal. The magnitude of the increase in the instantaneous reproduction speed can be made dependent here in particular on the specific value of the occupancy level of the FIFO memory.

In this case, the instantaneous reproduction speed then remains raised until the target value is reached again at a further time point at which the occupancy level of the FIFO memory is redetermined. The occupancy level of the FIFO memory is thereby kept constant as an average over time. Owing to the fact that this is performed in the same manner for all the mobile audio terminals, it is possible to synchronize the reproduction of the respective mobile audio terminals. The very slight variations that arise here in the instantaneous reproduction speed depend in this case on the maximum offset occurring between two signal pulses of the time reference signal, and hence lie far below the perception threshold of a user.

The transmitter preferably combines respective groups of data packets into time frames, wherein each frame exhibits a time pattern containing a transmission time and a quiet time, wherein all the data packets in a frame are transmitted during the transmission time, and wherein the quiet time in each frame is longer than the time gap between any two data packets. The gap between two adjacent data packets can be defined here in particular using the respective start and end time points. Owing to the comparatively small spatial distance of the transmission, the start time of the transmitter can be equated to the start time points of the respective receivers in this case. In particular, said gaps between data packets depend on the transmission protocol concerned. A transmission time shall be understood to mean here the time from the start time point of the first data packet to the end time point of the last data packet in a frame, i.e. the transmission time also includes intervals between individual data packets in a frame, during which intervals no transmission is made. The time reference signals can be generated particularly easily from the time pattern defined by the frames and in particular by the transmission times and quiet times.

Preferably each signal receiver generates said time reference signal from a periodicity of the received frames of data packets. A signal pulse of the time reference signal can be generated in this case at one or at each of a plurality of specified time points within a frame, i.e. at fixed time intervals from the start time point of the frame concerned, wherein the time points are determined by means of the internal clock of the mobile audio terminal. The differences in the individual clocks here result in a slight time offset between the mobile audio terminals. This can be restricted, however, by the maximum offset occurring between two signal pulses of the time reference signal, because with each signal pulse the internal clock can be readjusted to the time reference signal. By an advantageous selection of the time points for generating the time reference signal, which selection can be made in particular according to the transmission protocol defined by the transmitter, this very small offset is hence negligible.

It also proves advantageous if for each mobile audio terminal, the occupancy level of the FIFO memory is determined at least approximately at each of the time points defined on the basis of the time reference signal, and the FIFO signal is generated therefrom. Depending on the architecture of the FIFO memory, however, it can be too complicated to determine the occupancy level exactly, for instance if information to be buffered is not necessarily stored in physically contiguous areas. In this case, a range of byte values in which the occupancy level can currently be ranked is determined at each of the time points concerned, and an index of the determined range is accordingly output as a FIFO signal. If information to be buffered is distributed in the FIFO memory in different physical blocks of memory, for instance, then an appropriate range can be estimated from the number of memory blocks in which information is stored and the known size of the memory blocks.

In this case it is advantageous to define for each mobile audio terminal an upper limit and a lower limit for the occupancy level of the FIFO memory, wherein if the occupancy level exceeds the upper limit, the instantaneous reproduction speed is increased for a period defined on the basis of the time reference signal, and wherein if the occupancy level drops below the lower limit, the instantaneous reproduction speed is decreased for a period defined on the basis of the time reference signal. In particular this can also be done by determining at the defined time points whether the occupancy level of the FIFO memory lies in a range of byte values bounded by the upper and lower limits respectively.

Said increase or decrease in the instantaneous reproduction speed, starting at a first time point fixed by a signal pulse of the time reference signal, can last in particular until a subsequent signal pulse of the time reference signal or until a second time point fixed by this signal pulse. At the subsequent signal pulse or at the second time point, the occupancy level of the FIFO memory is then rechecked, and if the occupancy level is back between the upper limit and the lower limit, the instantaneous reproduction speed is adjusted on the basis of the internal clock concerned back to a value originally stipulated by the transmission protocol.

In another advantageous embodiment of the invention, for each mobile audio terminal an upper limit and a lower limit for the occupancy level of the FIFO memory are defined, wherein if the occupancy level exceeds the upper limit, an overshoot signal is generated, wherein if the occupancy level drops below the lower limit an undershoot signal is generated, and wherein the FIFO signal is generated from the overshoot signal and the undershoot signal. This variant is particularly advantageous if the occupancy level of the FIFO memory can be determined exactly. In this case, the FIFO signal is only generated when the occupancy level of the FIFO memory leaves the specified value range, which indicates a corresponding time offset (lag or lead) in the reproduction by the internal clock, and hence can be corrected in a resource-efficient manner because it is corrected on the basis of need. For this purpose, the time point at which the undershoot signal or the overshoot signal is generated is defined too with respect to the time reference signal.

Advantageously in this case, for each mobile audio terminal, if the FIFO signal contains an overshoot signal, the instantaneous reproduction speed is increased for a period defined on the basis of the time reference signal, and if the FIFO signal contains an undershoot signal, the instantaneous reproduction speed is decreased for a period defined on the basis of the time reference signal. At the end of the period defined on the basis of the time reference signal, the instantaneous reproduction speed is adjusted on the basis of the internal clock concerned back to a value originally stipulated by the streaming protocol. If at this time point the occupancy level of the FIFO memory does not lie in the specified value range, then an overshoot signal or an undershoot signal is generated again.

In another advantageous embodiment of the invention, for each mobile audio terminal, the instantaneous reproduction speed is set according to the FIFO signal to a level defined on the basis of the time reference signal and/or the occupancy level of the FIFO memory. This can be achieved particularly easily using a control system, because only one control loop needs to be implemented for this purpose, which loop uses a manipulated variable to control the instantaneous reproduction speed according to an error comprising the occupancy level of the FIFO memory with respect to a setpoint value or a setpoint range. In particular for this purpose, when an error exists, for instance if an upper limit is exceeded, the instantaneous reproduction speed can be increased from the reproduction speed specified by the transmission protocol by an amount defined on the basis of the occupancy level of the FIFO memory, even "until further notice" for a time period that is not defined in advance, until the occupancy level of the FIFO memory again lies in a specified range.

The invention also defines a hearing system having a plurality of mobile audio terminals, which each comprise a signal receiver, a First-In-First-Out memory and an audio reproduction unit, wherein the mobile audio terminals are designed to implement the method according to the invention. The advantages described for the method for synchronizing the reproduction of a digital signal sent by a transmitter and for the developments of the method can also be applied mutatis mutandis to the hearing system.

Said hearing system is advantageously in the form of a binaural hearing-aid apparatus comprising two hearing-aid devices. Owing to the power consumption restrictions imposed by the battery, a binaural hearing-aid apparatus that is designed for corresponding synchronization of the reproduction without the need for a radio link between the two hearing-aid devices of the binaural hearing-aid apparatus is particularly advantageous.

BRIEF DESCRIPTION OF THE SEVERAL VIEWS OF THE DRAWING

An exemplary embodiment of the invention is described in greater detail below with reference to a drawing, in which:

FIG. 1 shows a transmitter, which transmits to a binaural hearing-aid system comprising two hearing-aid devices a digital signal for reproduction;

FIG. 2 uses a timeline to show the temporal waveform of the digital signal of FIG. 1;

FIG. 3 shows in a block diagram the procedure of the method for synchronizing reproduction in one of the hearing-aid devices shown in FIG. 1.

Corresponding parts and variables are denoted by the same reference signs in each of the figures.

DESCRIPTION OF THE INVENTION

FIG. 1 shows schematically a hearing system 2 in the form of a binaural hearing-aid apparatus 1. The hearing system comprises two mobile audio terminals 4, which in the present case are each in the form of a hearing-aid device 6. Each of the two hearing-aid devices 6 of the binaural hearing-aid apparatus is designed to pick up sound from the surroundings using a microphone (not shown in greater detail), to amplify said sound in order to compensate for hearing loss of a user of the binaural hearing-aid apparatus 1, and to reproduce said sound to an ear of the user by means of an audio reproduction unit 10 comprising a loudspeaker 8.

In order to afford a better sound quality to the user when using entertainment equipment, for instance a television set 12, than would be possible by means of the above-described acoustic pick-up and reproduction of the sound produced by the loudspeakers of the television set 12, each hearing-aid device 6 is equipped with a signal receiver 14, which is designed to receive a digital signal 16 sent by a transmitter 18 connected to the television set 12. In this process, the live audio track of the television set 12 is encoded in the digital signal 16. The hearing-aid devices 6 can hence receive the audio track digitally via their respective signal receivers 14, and therefore it is possible to avoid sound losses in the acoustic transmission path from the loudspeakers of the television set 12 via the surroundings to the microphone of each hearing-aid device 6.

Reproduction of the digital signal 16 by the loudspeakers 8 of the hearing-aid devices 6 can prove problematic here, however. The reproduction speed, which ideally is given by the sample rate in the transmission protocol of the digital signal, is defined by an internal clock in the hearing-aid device 6 concerned. Owing to manufacturing variations in the two internal clocks of the hearing-aid devices 6, however, after prolonged reproduction of an audio track encoded in the digital signal 16, a slight time offset between the two hearing-aid devices 6 could arise, which is perceived by the user as a spatial shift in the reproduced sound. To prevent this, the two hearing-aid devices 6 must be synchronized with one another in the reproduction of an audio track encoded in the digital signal 16. For reasons of battery capacity, this synchronization is performed without additional communication between the hearing-aid devices 6; the digital signal 16 sent by the transmitter 18, which is identical for both hearing-aid devices 6, is used as the only time reference for synchronization.

FIG. 2 shows the temporal waveform of the digital signal 16 of FIG. 1 sent by the transmitter 18. The instantaneous data volume l in all transmission channels is plotted here against time t. The information is transmitted in the digital signal 16 in data packets 20. A single data packet 20 here constitutes a self-contained entity in time. For this purpose, in a specific transmission channel, which can be specified by a carrier frequency, for example, the signal is modulated continuously from the start time point 22 to the end time point 24 of an individual data packet 20 according to the bit values to be transmitted. No transmission of information takes place between different data packets 20, i.e. assuming the transmitter is actually emitting a transmit power, this becomes an unmodulated carrier frequency.

The respective data packets 20 are grouped into contiguous frames 26. In each frame 26, all the data packets 20 of the frame 26 concerned are sent in a transmission time 28. A quiet time 30 starts at the end of the last data packet 20 until the start of the next frame 26, in which quiet time no further data packets are sent. The quiet time 30 lasts longer than the time gap 32 between two successive data packets 20. In this context, some of the information encoded in the data packets 20 of a frame 26 is redundant in order for reproduction to be possible even when there is a transmission error in a data packet 20. This can be achieved, for example, by individual redundancy packets 33 provided for the purpose. A single frame 26 here constitutes the smallest unit specified in the transmission protocol that can be reproduced after decoding. The average data rate 34 of the transmitter refers to the volume of data that is actually sent, averaged over a plurality of frames 26. The average data volume 36, as the amount of information transmitted, averaged over a plurality of frames 26, is less than the average data rate 34 because of the redundancy. Deducting information that relates to instructions for the protocol and is usually stored in a preamble of each data packet 20, the average data volume 36 ideally equals the sample rate for the reproduction.

The time pattern given in the digital signal 16, which pattern is formed by the frames 26, by the transmission times 28 and the quiet times 30 in the frames 26, and by the individual data packets 20, can be used in each separate hearing-aid device 6 as an external time reference for the common synchronization.

FIG. 3 shows the method 40 for synchronizing the reproduction of the digital signal 16 with reference to the processes in a hearing-aid device 6 of the binaural hearing-aid apparatus 1 shown in FIG. 1. The processes in the second hearing-aid device, which is not shown in greater detail, proceed analogously; the reproduction in both hearing-aid devices is synchronized by means of synchronization with the digital signal 16 and hence implicitly by means of a common synchronization with the internal clock of the transmitter 18.

The signal receiver 14 of the hearing-aid device comprises an antenna 42, which receives the digital signal 16, and a decoder 44, which decodes the individual received data packets 20 and extracts the information contained therein. The information extracted from the data packets, which is provided for the audio reproduction, i.e. the information from the received data packets cleaned of redundant information and preamble data in the data packets 20, is written into a FIFO memory 45 by the decoder 44. The decoder 44 is also connected to the internal clock 46 of the hearing-aid device 6 in order to be able to identify the time sequence of the received data packets 20 and to identify therefrom the start of individual frames 26. At the start of each frame 26, which is identified from the preceding quiet time 30, the decoder 44 in the signal receiver 14 generates a signal pulse of a time reference signal 48.

At specific time points defined by the time reference signal 48, where the time is measured by means of the internal clock 46, the occupancy level of the FIFO memory 45 is determined at least approximately. This can be done, for example, by evaluating the physical memory blocks of the FIFO memory 45 that are occupied at least partially with information at the time of the measurement. The information about the occupancy level is output as a FIFO signal 50. An upper limit 52 and a lower limit 54 are defined here for the occupancy level of the FIFO memory 45. If the upper limit 52, the definition of which can also take into account the accuracy of the evaluation of the occupancy level, is exceeded, then an overshoot signal 56 is generated, which is incorporated in the FIFO signal 50. Correspondingly, if the occupancy level drops below the lower limit 54, then an undershoot signal 58 is generated, which likewise is incorporated in the FIFO signal 50.

The FIFO signal 50 is then used for the reproduction as follows: the audio data of the FIFO memory 45 is output to the audio reproduction unit 10, in which it is converted by a codec 60 into individual samples 62, which the loudspeaker 8 reproduces. The reproduction speed of the samples 62, which is set by the internal clock 46, is initially based on a sample rate specified by the transmitter 18 through the transmission protocol. The play-out of the samples 62 continually removes information from the FIFO memory 45. Since in the ideal case, the rate at which new audio data from received data packets 20 is written into the FIFO memory equals the sample rate, the occupancy level of the FIFO memory 45 remains constant as a time-average over frames 26.

As a result of the described variations in the internal clock 46, however, the rate of the audio data, which is defined by the transmitter 18 via the digital signal 16, can differ from the actual reproduction speed at which the samples 62 are reproduced. If reproduction is too slow, for example, then the FIFO memory 45 fills until the upper limit 52 is exceeded, and an overshoot signal 56 is incorporated in the FIFO signal 50. The overshoot signal 56 is passed to the audio reproduction unit 10 as trigger information to temporarily increase slightly the instantaneous reproduction speed 64. This increase can last, for example, until the next signal pulse of the time reference signal 48, or until a time point 66 fixed with respect to the time reference signal 48 by the internal clock 46. On the occupancy level dropping below the lower limit 54, the instantaneous reproduction speed 64 must be reduced accordingly.

The duration and the magnitude of the increase in the instantaneous reproduction speed 66 shall preferably be selected such that, taking into account the variations from an ideal timing that can normally be expected for the internal clock 46 when restoring the reproduction speed, which corresponds to reproduction at the sample rate defined by the transmission protocol, the occupancy level of the FIFO memory 45 again lies between the upper limit 52 and the lower limit 54. In a time-average obtained over a plurality of frames 26, the occupancy level of the FIFA memory 45 can hence be held between the two limits 52, 54 and thus kept substantially constant, whereby the reproduction is synchronized with respect to an internal clock of the transmitter 18 at the data rate 34 defined by the transmitter 18. Since the described processes are performed in the same manner for both hearing-aid devices 6 of the binaural hearing-aid apparatus 1, the respective reproductions of the hearing-aid devices 6 are thereby also synchronized with one another.

In an alternative embodiment, the FIFO signal 50 can also be formed solely by the overshoot signal 56 and the undershoot signal 58, which are each generated precisely when the occupancy level of the memory goes above the upper limit 52 or respectively below the lower limit 54. In other words, the occupancy level is not determined at time points fixed with respect to the time reference signal 48, but instead the overshoot signal 56 is output instantaneously, wherein the time point of the overshoot with respect to the time reference signal 48 is detected by the internal clock 46 for the further procedure.

Although the invention has been illustrated and described in greater detail using the preferred exemplary embodiment, the invention is not limited by this exemplary embodiment.

A person skilled in the art can derive other variations therefrom without departing from the scope of protection of the invention.

LIST OF REFERENCES

1 binaural hearing-aid apparatus
2 hearing system
4 mobile audio terminal
6 hearing-aid device
8 loudspeaker
10 audio reproduction unit
12 television set
14 signal receiver
16 digital signal
18 transmitter
20 data packet
22 start time point
24 end time point
26 frame
28 transmission time
30 quiet time
32 gap between two data packets
33 redundancy packet
34 average data rate
36 average information rate
40 method
42 antenna
44 decoder
45 FIFO memory
46 internal clock
48 time reference signal
50 FIFO signal
52 upper limit
54 lower limit
56 overshoot signal
58 undershoot signal
60 codec
62 sample
64 instantaneous reproduction speed
66 defined time point
t time axis
l data volume

The invention claimed is:

1. A method for synchronizing a reproduction of a digital signal sent from a transmitter to a plurality of mobile audio terminals, wherein each of the mobile audio terminals has a signal receiver, a First-In-First-Out memory connected to the signal receiver and an audio reproduction unit connected to the FIFO memory, the method comprising:
  sending the digital signal from the transmitter as a multiplicity of data packets at a data rate that is constant as an average over time;
  each mobile audio terminal in each case:
    receiving with the signal receiver at least a subset of the multiplicity of data packets;
    generating with the signal receiver a time reference signal from the received data packets;
    generating from the FIFO memory a FIFO signal containing information on an occupancy level of the First-In-First-Out memory at specific time points;
    setting an instantaneous reproduction speed on a basis of the time reference signal and the FIFO signal;
    reproducing with the audio reproduction unit at the instantaneous reproduction speed samples corresponding to the digital signal; and thereby keeping constant the occupancy level of the FIFO memory as an average over time.

2. The method according 1, which comprises:
combining with the transmitter respective groups of data packets into temporal frames;
wherein each frame has a time pattern containing a transmission time and a quiet time;
transmitting all the data packets in a frame during the transmission time; and
wherein the quiet time in each frame is longer than a time gap between any two data packets.

3. The method according to claim 2, which comprises generating with each signal receiver the time reference signal from a periodicity of the frames of data packets received by the signal receiver.

4. The method according to claim 1, which comprises for each mobile audio terminal, determining the occupancy level of the FIFO memory at least approximately at each of the time points defined on the basis of the time reference signal, and generating the FIFO signal therefrom.

5. The method according to claim 4, which comprises, for each mobile audio terminal:
defining an upper limit and a lower limit for the occupancy level of the FIFO memory;
when the occupancy level exceeds the upper limit, increasing the instantaneous reproduction speed for a period defined on a basis of the time reference signal; and
when the occupancy level drops below the lower limit, decreasing the instantaneous reproduction speed for a period defined on the basis of the time reference signal.

6. The method according to claim 1, which comprises, for each mobile audio terminal:
defining an upper limit and a lower limit for the occupancy level of the FIFO memory;
when the occupancy level exceeds the upper limit, generating an overrun signal;
when the occupancy level drops below the lower limit, generating an underrun signal; and
generating the FIFO signal from the overrun signal and the underrun signal.

7. The method according to claim 6, which comprises, for each mobile audio terminal:
when the FIFO signal contains the overrun signal, increasing the instantaneous reproduction speed for a period defined on a basis of the time reference signal; and
when the FIFO signal contains the underrun signal, decreasing the instantaneous reproduction speed for a period defined on the basis of the time reference signal.

8. The method according to claim 1, which comprises, for each mobile audio terminal, setting the instantaneous reproduction speed according to the FIFO signal to a level defined on the basis of the time reference signal and/or the occupancy level of the FIFO memory.

9. A hearing system, comprising:
a plurality of mobile audio terminals each containing a signal receiver, a First-In-First-Out memory and an audio reproduction unit; and
said mobile audio terminals being configured to implement a method for synchronizing a reproduction of a digital signal sent from a transmitter to the plurality of mobile audio terminals, the method including the following steps:
sending the digital signal from the transmitter as a multiplicity of data packets at a data rate that is constant as an average over time;
each mobile audio terminal in each case:
receiving with the signal receiver at least a subset of the multiplicity of data packets;
generating with the signal receiver a time reference signal from the received data packets;
generating from the FIFO memory a FIFO signal containing information on an occupancy level of the First-In-First-Out memory at specific time points;
setting an instantaneous reproduction speed on a basis of the time reference signal and the FIFO signal;
reproducing with the audio reproduction unit at the instantaneous reproduction speed samples corresponding to the digital signal; and
thereby keeping constant the occupancy level of the FIFO memory as an average over time.

10. The hearing system according to claim 9, comprising two hearing-aid devices forming a binaural hearing-aid apparatus.

* * * * *